United States Patent [19]
Maier

[11] Patent Number: 6,035,744
[45] Date of Patent: Mar. 14, 2000

[54] METHOD FOR THE PRODUCTION OF A CUTTING INSERT FOR THREAD CUTTING

[75] Inventor: Johann Maier, Pflach, Austria

[73] Assignee: Schwarzkopt Technologies Corp., Franklin, Mass.

[21] Appl. No.: 09/185,954

[22] Filed: Nov. 4, 1998

[30] Foreign Application Priority Data

Nov. 4, 1997 [AT] Austria .................................. 685/97 U

[51] Int. Cl.[7] .................................................. B23G 5/06
[52] U.S. Cl. ................................ 76/117; 409/65; 470/198
[58] Field of Search .................................. 76/104.1, 117, 76/106.5; 470/198, 204; 409/65; 419/28

[56] References Cited

U.S. PATENT DOCUMENTS

| | | | |
|---|---|---|---|
| 2,581,690 | 1/1952 | Moelle et al. | 470/198 |
| 4,408,418 | 10/1983 | Corrette | 76/117 X |
| 4,462,727 | 7/1984 | Marburger | 470/198 |
| 5,515,750 | 5/1996 | Green | 76/117 |

*Primary Examiner*—Douglas D. Watts
*Attorney, Agent, or Firm*—Morgan & Finnegan, LLP

[57] ABSTRACT

The invention concerns a process for the manufacture of a cutting insert (1) for thread cutting, with several cutting teeth (2–6) simultaneously engaged in incrementally cutting the thread profile. The blank is manufactured by pressing and sintering so that the relief angles of the flanks of the side cutting edges (9,10) of the individual teeth (2–6) are at least 3° and the profile depth of the final cutting tooth (6) which makes the finishing cut on the thread fits within the required final measurement tolerances, while the thickness of the cutting insert (1) and the tooth width (b) of the cutting teeth (2, 3, 4, 5, 6) are oversized. Subsequently, the blank is mechanically processed on the back face (7) and/or the front face (8) until the tooth width (b) of the cutting teeth (2, 3, 4, 5, 6) and the thickness (d) of the cutting insert (1) fit within the required final measurement tolerances.

3 Claims, 1 Drawing Sheet

METHOD FOR THE PRODUCTION OF A CUTTING INSERT FOR THREAD CUTTING

FIELD OF THE INVENTION

The invention concerns a process for the manufacture of a cutting insert for thread cutting, and in particular an insert with several cutting teeth simultaneously engaged in incrementally cutting a thread profile.

BACKGROUND OF THE INVENTION

Cutting inserts with several cutting teeth simultaneously engaged in an incrementally cutting thread profile of increasing depth are used particularly in the manufacture of internal and external threads on pipes used in the oil and natural gas industries. These types of threads must be manufactured to extremely close tolerances. The close tolerances demand a very high degree of dimensional accuracy in the cutting inserts. This is particularly true for the last or finish cutting tooth, which makes the finishing cut on the thread.

The production of these cutting inserts out of durable material, usually a hard metal, involves a powder metallurgical process. Traditionally, pressing and sintering have been used to form a blank of the cutting insert without shaping the individual cutting teeth. After the blank is formed, the cutting inserts are surface ground on the back face and the front face serving as chip removing plane to produce the thickness of the cutting insert within the required tolerances. Then, the cutting teeth are created by grinding several blanks in a stack with a profile grinding wheel. Thus, the final dimensions for profile depth and tooth width of the individual cutting teeth are achieved in a single grinding operation.

Using this process the flanks of the side cutting edges of the individual cutting teeth can only be ground parallel to one another. As a result, the necessary cutting relief angles of these cutting edges are achievable in a limited quality only.

These relief angles are achieved by the process of tilting the cutting inserts before using the profile grinding wheel, in order to achieve the necessary relief angles of the flanks of the end cutting edges of the individual cutting teeth. Then when the cutting inserts are held by the toolholder at a rake angle of less than 0°, this also results in relief angles of the flanks of the side cutting edges of the individual cutting teeth because the side cutting edges each form angles of over 90° with the end cutting edge.

Particularly in the case of cutting inserts on which these angles exceed 90° by only a small amount, the relief angle of the side cutting edges is also very small and often far from the optimal value of approximately 6° which is necessary for cutting. This results in rapid wear of these side cutting edges.

Furthermore, these relief angles cannot be increased freely by tilting the cutting inserts to a greater degree for the profile grinding operation, since then the front rake, and with it the mechanical stability of the end cutting edges, would be too small.

SUMMARY OF THE INVENTION

One object of the present invention is to provide for the optimal relief angles on all the cutting edges of the individual teeth of the above-named cutting inserts for thread cutting. This includes teeth with unfavorable geometry. Providing the optimal relief angles achieves a distinctly longer tool life for the cutting inserts. Furthermore, the production of the cutting inserts is more economical.

According to the invention, this object is achieved by initially forming the blank with the shape of the individual cutting teeth, including:

relief angles of at least 3° for the flanks, which approach each other conically, of the side cutting edges of the individual teeth;

on the final tooth which makes the finishing cut on the thread, a profile depth which fits within the required final measurement tolerances;

oversizing in the thickness of the cutting insert and in the tooth width of the cutting teeth; and mechanically processing the blanks on the back face and/or the front face until the tooth width of the cutting teeth and the thickness of the cutting insert fit within the required final measurement tolerances.

DETAILED DESCRIPTION OF THE INVENTION

Figure 1:
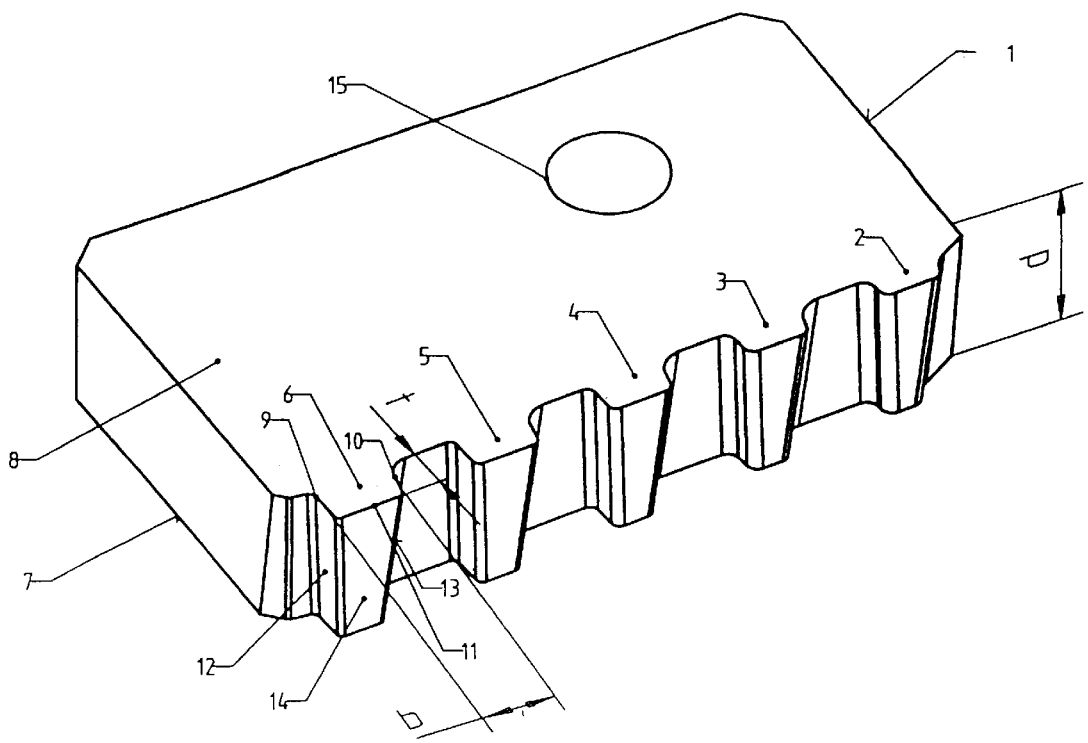
FIG. 1 shows a perspective view of a cutting insert for thread cutting manufactured by the process according to the invention.

In the powder metallurgical production of molded parts, it is difficult to produce molded parts with great dimensional accuracy without subsequent finishing operations because of the material shrinkage during sintering and the distortion of the compact. This applies even with simple shapes that have straight surfaces that are perpendicular to one another. In the present case of a thread cutting insert with a more complex form, where, due to the necessary relief angles, there are also diagonally oriented surfaces, the compact is compressed to varying degree. This variation in compression leads to varying degree of shrinkage as well as more pronounced distortion problems. For this reason it is difficult to produce cutting inserts that display several exact measurements within extremely close tolerances without expensive mechanical finishing operations on the whole profile of these cutting teeth. In the present specific case, those measurements are the profile depth and the tooth width of the final cutting tooth.

As previously known, all of the exact dimensions of the cutting teeth are produced in one step. According to the method of the invention, producing all of the exact dimensions of the cutting teeth is accomplished in two separate steps. In a first step, the exact dimension of the profile depth of the final or finish cutting tooth is achieved within required final measurement tolerances by deliberate configuration of the pressing tool. As a result, this dimension is already correct after pressing and sintering, without any further finishing operations. In a second step, the exact tooth width of the cutting teeth and the exact thickness of the cutting insert are then created by a mechanical finishing operation, which is the simple surface grinding of the back face and/or the front face. Since these grinding operations are also necessary in the state of the art production of cutting inserts, the elimination of the costly profile grinding operation achieves a considerable cost savings in manufacturing the cutting inserts compared with the prior production process. At the same time, the cutting geometry is improved and the tool life is extended. By eliminating the profile grinding step, it is also possible to produce side cutting edge flanks that approach each other conically, making considerably larger relief angles of these surfaces possible.

A particularly advantageous application of the process according to the invention is when, after the blank is produced, first the back face of the cutting insert is pre-ground a certain amount, then the front face is ground until the desired tooth width of the finishing cutter is achieved, and finally the back face is given a final grinding until the desired thickness tolerance of the cutting insert is achieved.

In this process it is important that the pre-grinding of the back face of all the cutting inserts from one production run is done to the same degree of removal. This eliminates the variation in thickness of the blanks caused by the production, which would otherwise cause a variance in the tooth width of the finishing cutter and in the thickness of the plate.

The most common thread type for applications in the oil industry is the buttress thread. In the manufacture of this type of thread, it is particularly advantageous to use the process according to the invention, and it is practical to manufacture thread cutting inserts with five incrementally sized cutting teeth on which the relief angles of the flanks of the side cutting edges equal 5° and the relief angles of the flanks of the end cutting edges equal 6°.

With these relief angles, optimal cutting conditions are created which guarantee a long tool life for the cutting inserts.

Figure 2:
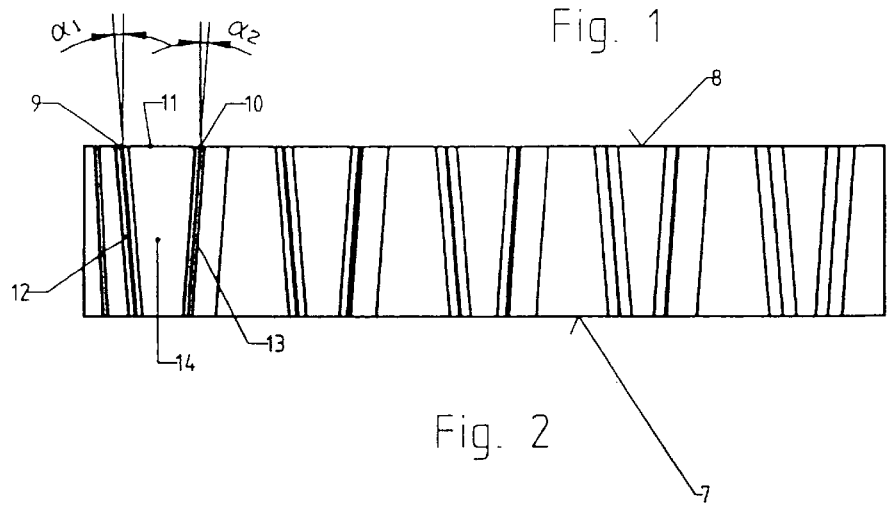
FIG. 2 shows the front [end] view of the cutting insert shown in FIG. 1.
Figure 3:
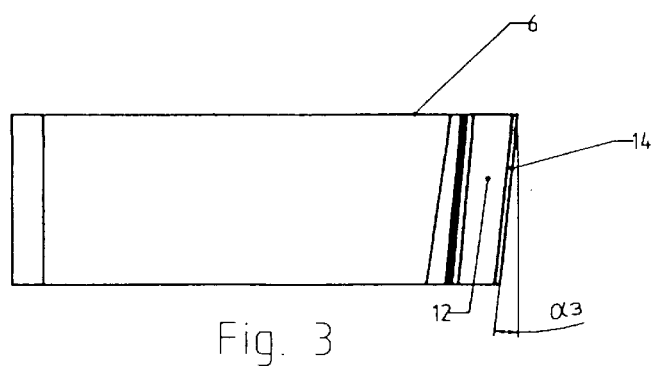
FIG. 3 shows the left side view of the cutting insert shown in FIG. 1.

FIGS. 1–3 show a cutting insert (1) manufactured by the process according to the invention for the production of a buttress thread. The cutting insert is one-sided and features five incrementally sized cutting teeth in a row (2)–(6), which cut the thread in varied increments from the first precutting with tooth (2) to the final finishing cut of the thread by the finishing cutter (6).

Characteristic of this cutting insert (1) are the large relief angles of the flanks of the side cutting edges of the individual teeth (2)–(6), which can only be economically manufactured in larger quantities when using the manufacturing process according to the invention. These relief angles are shown in more detail in FIG. 2 as α1 for the flank (12) of the side cutting edge (9), and as α2 for the flank (13) of the side cutting edge (10), in the case of the finish cutter (6). Relief angles α1 and α2 each equal 5°. The relief angles of the flanks of the end cutting edges of the individual teeth (2)–(6) are shown for example in FIG. 3, again for the finish cutter (6). The relief angle α3 of the flank (14) of the end cutting edge (11) equals 6°.

According to the invention, the cutting insert (1) shown in FIGS. 1–3 is manufactured by first forming a blank by pressing and sintering so that the relief angles of the flanks of the side cutting edges of the individual cutting teeth (2)–(6) equal 5° and so that the profile depth (t) of the finish cutter (6) fits within the required final measurement tolerances, and so that the blank is oversized in the thickness (d) of the cutting insert (1) and in the tooth widths (b) of the cutting teeth.

In order to achieve this it is necessary to configure the pressing tool in such a way that the shrinkage that occurs during sintering is exactly compensated for, which should pose no great problem for the specialist and should lie within his field of expertise, in view of the fact that only one measurement, namely the profile depth (t) of the finish cutter (6), must be precisely met.

After production of the blank it is expediently first surface ground on the back face (7) of the cutting insert (1). If all the cutting inserts in one production batch are ground to the same measure, then the irregularity in the variation in thickness caused by the method of production is essentially eliminated. After this first surface grinding of the back face (7), the front face (8) is surface ground until the tooth width (b) of the finish cutter (6) exhibits measurements that fit within the required final measurement tolerances, the tooth width (b) being measured at the height of half the profile depth (t) of the tooth. Finally, the cutting insert is once again surface ground on the back face (7) until the thickness (d) of the cutting insert (1) fits within the required final measurement tolerances.

The figures and the production example describe only one particularly advantageous embodiment of the invention. It is, however, in no way limited to these.

So it is also conceivable that the cutting insert, in the form of a rotatable indexable cutting insert, has two or more toothed sides for thread cutting.

In the same way it is conceivable that the grinding of the cutting insert on the back face can be omitted.

Likewise, the process according to the invention is also economically applicable to the manufacture of cutting inserts for the production of trapezoidal threads or also of round threads.

I claim:

1. A process for the manufacture of a cutting insert for thread cutting, with several individual cutting teeth which are simultaneously engaged in incrementally cutting a thread profile, comprising;

(i) pressing and sintering of a blank;

(ii) finishing operations to finish the blank to specified dimensions, wherein the pressing and sintering of the blank includes the shape of the individual cutting teeth, including relief angles of at least 3° for flanks, which approach each other conically, of side cutting edges of the individual cutting teeth;

on a final tooth, which makes a finish cut on the thread, a profile depth which fits within the required final measurement tolerances;

oversizing in a thickness of the cutting insert and in a tooth width of the individual cutting teeth; and wherein the finishing operations include mechanically processing a back face and/or a front face of the blank until the tooth width of the individual cutting teeth and the thickness of the cutting insert fit within the required final measurement tolerances.

2. A process for the manufacture of a cutting insert for thread cutting according to claim 1, wherein after pressing and sintering the blank, the back face of the cutting insert is ground a certain amount; then the front face is ground until the desired tooth width of the individual cutting teeth is achieved; and finally the back face is ground again, until the desired thickness of the cutting insert is achieved.

3. A process for the manufacture of a cutting insert for thread cutting according to claim 1, wherein the thread has a buttress thread profile, the individual cutting teeth comprising five cutting teeth in a row, and on the five cutting teeth, the relief angles of the flanks of the side cutting edges equal 5° and a relief angle of a flank of an end cutting edge equals 6°.

* * * * *

UNITED STATES PATENT AND TRADEMARK OFFICE
CERTIFICATE OF CORRECTION

PATENT NO. : 6,035,744
DATED : March 14, 2000
INVENTOR(S) : Johann MAIER

It is certified that error appears in the above-identified patent and that said Letters Patent is hereby corrected as shown below:

On the cover page, item [73]: Assignee: "Schwarzkopt Technologies Corp." should read -- Schwarzkopf Technologies Corp. --

Signed and Sealed this

Eighth Day of May, 2001

Attest:

NICHOLAS P. GODICI

Attesting Officer

Acting Director of the United States Patent and Trademark Office